United States Patent [19]

Akagi et al.

[11] Patent Number: 5,478,098
[45] Date of Patent: Dec. 26, 1995

[54] AIR INTAKE DEVICE FOR AUTOMOTIVE ENGINE

[75] Inventors: Toshimichi Akagi; Nariyasu Oki, both of Hiroshima, Japan

[73] Assignee: Mazda Motor Corporation, Hiroshima, Japan

[21] Appl. No.: 76,901

[22] Filed: Jun. 15, 1993

[30] Foreign Application Priority Data

Jun. 15, 1992 [JP] Japan .................................. 4-180414

[51] Int. Cl.⁶ .................................................. B60K 13/02
[52] U.S. Cl. ...................... 180/68.3; 180/68.2; 180/69.22
[58] Field of Search .................................. 180/68.3, 68.2, 180/69.21, 69.22, 69.24, 68.1; 55/385.3, DIG. 28; 123/198 E; 296/208; 293/113

[56] References Cited

U.S. PATENT DOCUMENTS 4,896,734  1/1990  Horiuchi et al. ...................... 180/68.3

FOREIGN PATENT DOCUMENTS

| 0065183 | 11/1982 | European Pat. Off. | ............. 180/68.3 |
| 3701736 | 8/1988 | Germany | ............................. 180/68.3 |
| 61-147624 | 9/1986 | Japan . | |
| 0128829 | 6/1987 | Japan | ................................. 180/68.3 |
| 0197119 | 8/1989 | Japan | ................................. 180/68.3 |
| 0147434 | 6/1990 | Japan | ................................. 180/68.3 |

Primary Examiner—Margaret A. Focarino
Assistant Examiner—Carla Mattix
Attorney, Agent, or Firm—Keck, Mahin & Cate

[57] ABSTRACT

An air intake device for introducing air into an engine includes an intake duct, part of which is disposed in a space defined by a front wheel apron forming an inner wall of an engine compartment, and a front fender for forming an outer wall of a vehicle body. A hole is formed in the wheel apron for providing an opening through which an upstream portion of the intake duct passes so as to have its intake opening open into the engine compartment.

6 Claims, 3 Drawing Sheets

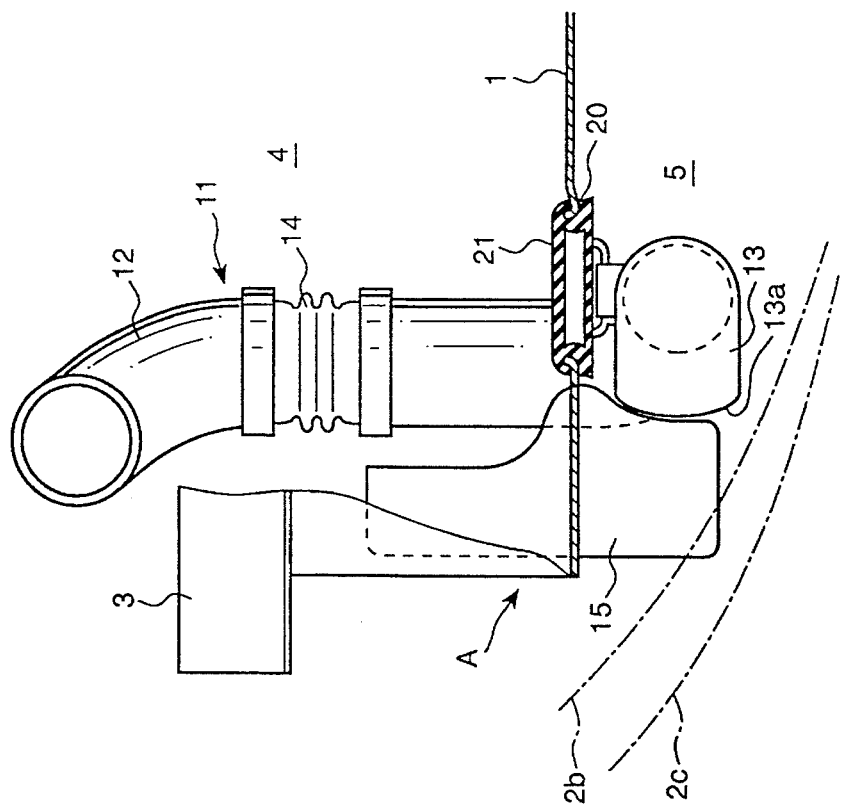
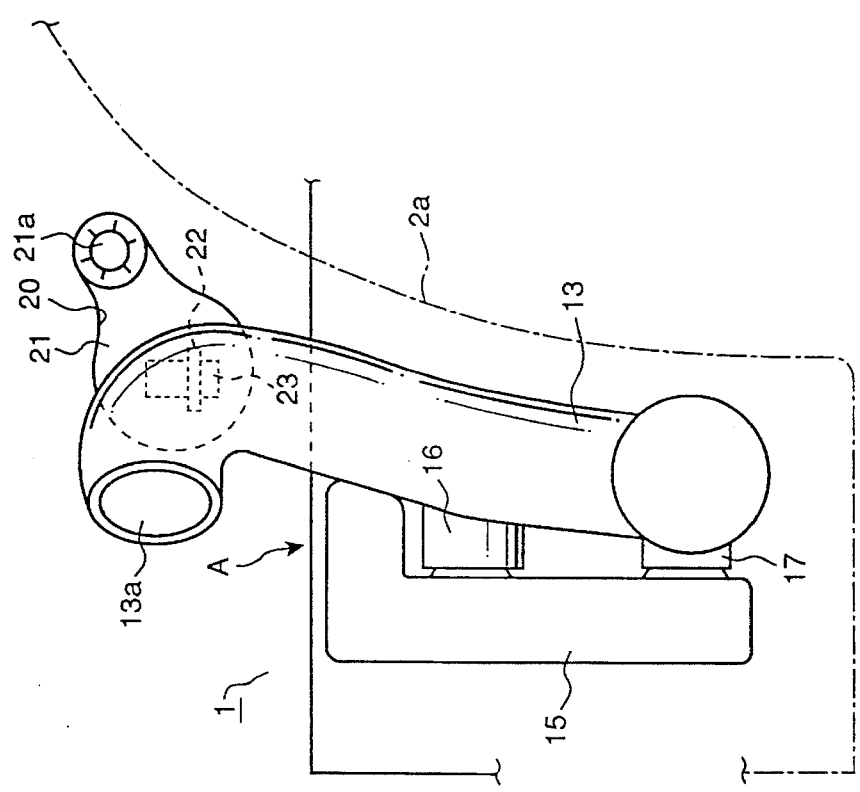

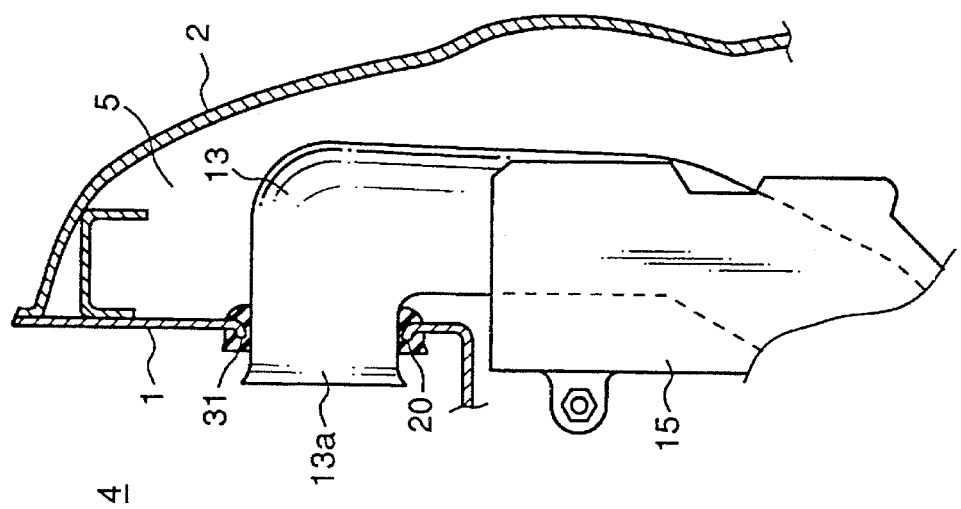
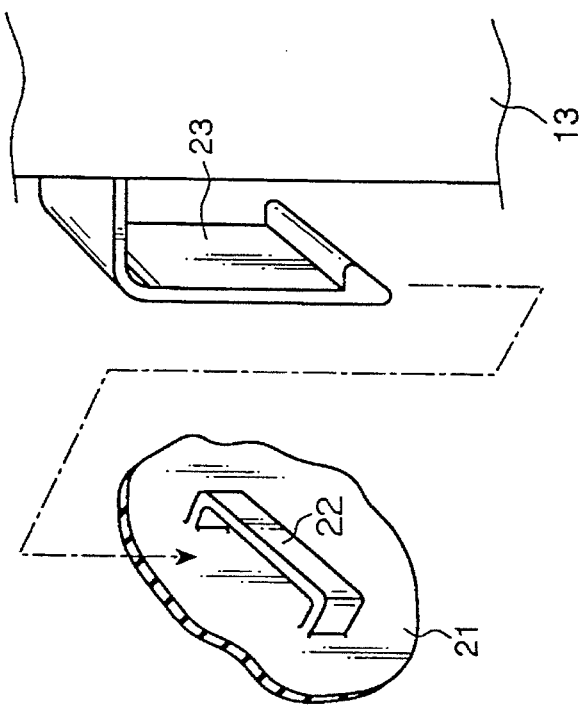

AIR INTAKE DEVICE FOR AUTOMOTIVE ENGINE

BACKGROUND OF THE INVENTION

1. Field of the Invention

This invention relates to a device for introducing air into an engine and, more particularly, to a setting of an air intake duct of an air intake device.

2. Description of the Related Art

Heretofore, various devices have been employed to provide an engine with air through the utilization of air intake ducts. The need for longer ducts has led to their placement in a space formed between a wheel apron and a fender. An air intake opening of the air duct is also located within this space. Such an air intake device is known from, for instance, Japanese Unexamined Patent Publication No. 61-147624.

An air duct, of considerable length can be placed in such a place, by being extended below a front side frame from the engine compartment, in order to minimize the loss of engine compartment space. By co-locating the air intake opening within this space, it is possible to supply the engine with air from this space which is cooler than air in the engine compartment.

However, locating a long air duct within a space formed between the wheel apron and fender and co-locating an air intake opening in the same space may result in causing a considerable amount of noise within the passenger compartment. The interior noise is especially annoying with an ordinary engine which is not supercharged.

The results of studies made on the causes of noise in a vehicle compartment show that pulsations of intake air are released through the air intake duct. More specifically, released pulsations of intake air are transmitted to a cowl box through a space within the wheel apron and the released pulsations are then manifest as noise in the passenger compartment through air-conditioner components located within the cowl box.

With a naturally aspirated, or ordinary, engine, the vibration of the air duct is found to contain a significant amount of low frequency vibrations, so as to cause the interior noise to become even more pronounced. On the other hand, a supercharged engine, particularly one equipped with a mechanically driven supercharger, is lacking in serious noise because a considerable amount of low frequency noise components originating in the air duct are absorbed by the supercharger.

There are two types of noise problems, i.e. noise which originates in vibrations of the air duct caused by the pulsations of intake air, which are transmitted into the passenger compartment through the car body where they are manifest as noise, and noise which is created by the pulsations of intake air which are released from an air intake opening of the air duct and transmitted into the passenger compartment where they are manifest as noise. The first type can be handled through the strategic placement of rubber mounts. However, the latter type of noise is carried through the air within the space inside the wheel apron and is transmitted to the passenger compartment. Of the two, the latter type remains the main problem.

SUMMARY OF THE INVENTION

It is an object of the present invention to provide an air intake device, with an air duct disposed within a space formed between a wheel apron and a fender, which can eliminate passenger compartment noise.

This object is accomplished by providing an air intake device structured so that an air intake duct for an engine is displaced within a space formed between a wheel apron and a fender. The air intake duct passes through the wheel apron inwardly toward and into an engine compartment so as to place an air intake opening thereof so that it opens into the engine compartment. The wheel apron is formed with an opening enabling the air intake duct to communicate with the engine compartment. This permits a choice, based upon the type of engines, between a first setting for ordinary engines, wherein air is introduced through the air intake opening into the engine compartment, and a second setting for supercharged engines, in which the air intake opening of the air intake duct opens within the space between the wheel apron and the fender. When the second setting is chosen, the opening of the wheel apron is closed.

The attachment of the air intake duct on the car body is accomplished by means of a sealing member equipped with an engagement means, the air intake duct being fitted with the counterpart engagement means.

With the device according to the present invention, since the air intake opening opens into the spacious engine compartment, the intensity of pulsations due to intake air are held to a relatively low level so that the noise level within the passenger compartment is significantly reduced. The intake of water, which might otherwise find its way into the space between the wheel apron and the fender, can also be avoided.

Moreover, the device according to the present invention requires little more than a simple construction in which only the terminal end of the air intake duct passes through the wheel apron to open into the engine compartment. This arrangement is especially beneficial for controlling noise in a naturally aspirated or ordinary engine, in which low frequency vibrations constitute the main source of the problem.

According to the air intake device of this invention, in which a selection is made between the first setting, wherein the air intake opening of the air intake duct opens into the engine compartment, and the second setting, wherein the air intake opening is located in the space between the wheel apron and the fender, it is possible to choose, on the basis of engine types, to either use outside cool air coming from the space or control the internal noise within the passenger compartment.

In the first setting, outside cool air from the space between the wheel apron and the fender is introduced to improve the charging efficiency of a supercharged engine, for which the interior noise is not a significant problem. However, for a naturally aspirated engine, in which the temperature of the intake air is not a critical factor of performance, the second setting, in which air is introduced from within the engine compartment, is effective in controlling the interior noise and also prevents the inadvertent intake of water as well.

By adaptation of a mechanism to selectively seal the opening, properly locating the air intake duct is enabled.

BRIEF DESCRIPTION OF THE DRAWINGS

The above and other objects and features of the present invention will be apparent from the following detailed description with respect to a preferred embodiment thereof when considering in conjunction with the appendix drawings, in which:

FIG. 2 a side view of the air intake device shown in FIG. 1;

FIG. 3 is a plan view of FIG. 1 showing the detail of the air intake duct with an air cleaner removed;

FIG. 4 a detailed perspective view of engagement members formed on a sealing member and the air intake duct, respectively; and FIG. 5 is a front view, similar to FIG. 1, in which the air intake opening opens into the engine compartment.

DETAILED DESCRIPTION OF THE PREFERRED EMBODIMENT

Figure 1:
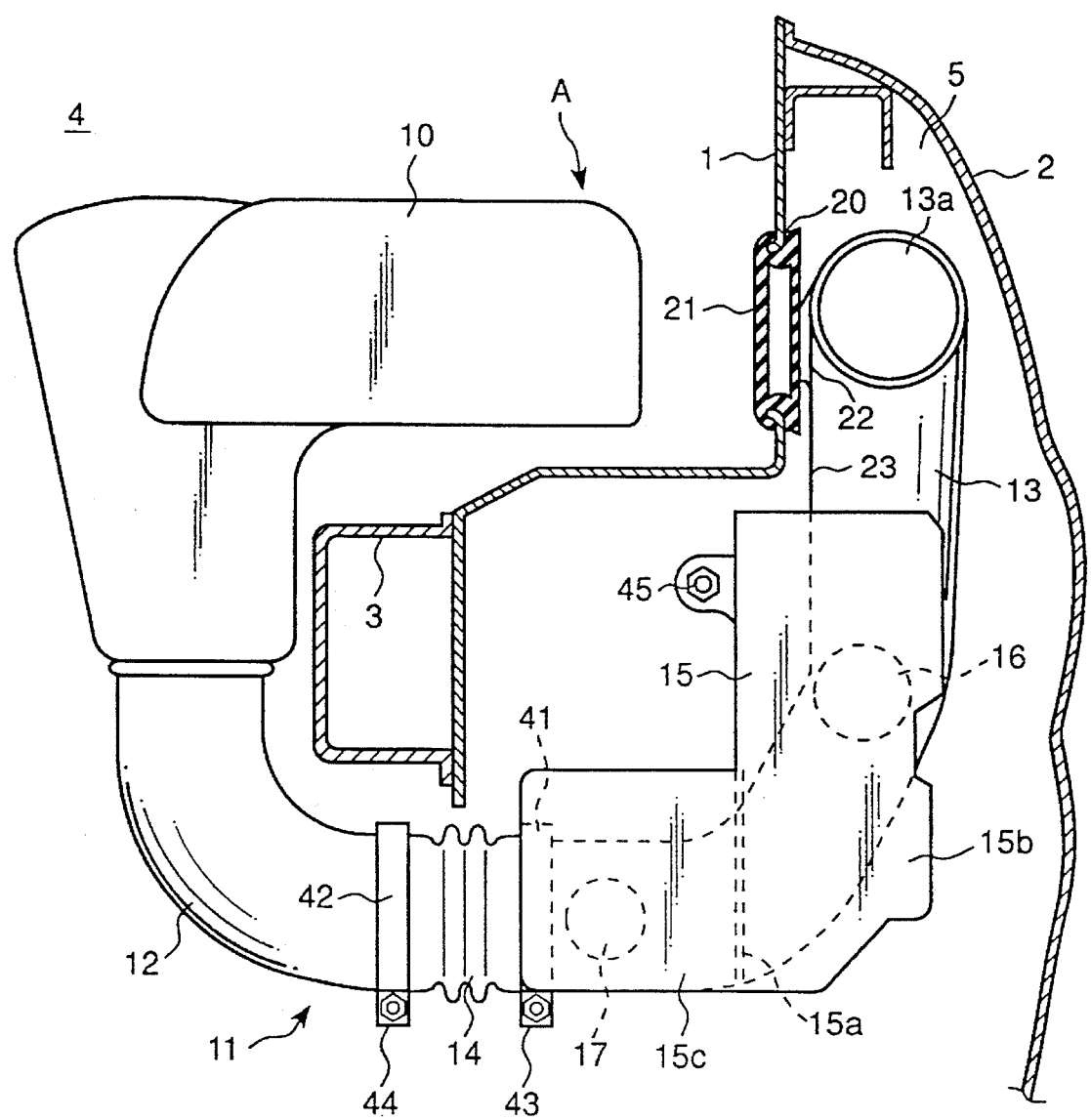
FIG. 1 is a front view, partially in cross-section, of an air intake device in accordance with a preferred embodiment of the present invention, in which an air intake opening of an air intake duct opens into a specific space.

Referring to the drawings in detail and, in particular, to FIGS. 1 to 3, an air intake device, generally indicated by a reference character A, in accordance with a preferred embodiment of the present invention is shown. The air intake device A is disposed in an engine compartment 4 formed between left and right wheel aprons 1 and fenders 2 (only one of which is shown). A space 5 is formed between a front wheel apron 1, secured to a front side frame 3, and a front fender 2, within which an air intake duct 11 extends. In FIGS. 2 and 3, which show a front left portion of a vehicle, the front fender 2 is schematically depicted by an edge 2a adjacent to a wheel apron arch (not shown) and is also schematically depicted by contours 2b and 2c at different heights. Although an engine, located within the engine compartment 4, is not shown in FIGS. 1 to 3, it is, for instance, equipped with a mechanical supercharger.

Inside the engine compartment 4, there is disposed an air cleaner 10 placed near the front wheel apron 1, which in turn is fixed to the car body with brackets (not shown). An air duct 11 is connected with a bottom face of the air cleaner 10. The air duct 11 is comprised of a downstream air duct 12, an upstream air duct 13 and a rubber joint 14 which connects the downstream and upstream air ducts 12 and 13. The air duct 11 is connected at its downstream end of the downstream air duct 12 to the air cleaner 10. The downstream air duct 12 initially commences downward from the air cleaner 10 and then extends outwardly in the transverse direction toward the car body, finally reaching approximately below the front side frame 3. On the other hand, the upstream air duct 13 initially starts at an air intake opening 13a, which opens toward the front, and extends some distance backward. The upstream air duct then turns almost straight down. It further extends toward the center of the car. Below the front side frame 3, a joint 14 connects the downstream air duct 12 and upstream air duct 13 in the vicinity of the location at which the ends of both air ducts 12 and 13 extend laterally to meet each other.

Part of the upstream air duct 13, which includes the air intake opening 13a and the vertically extending part, is located within the space 5 formed between the wheel apron 1 and the fender 2. The space 5 is also used for the placement of a resonator 15, which is located in front of the upstream air duct 13. Viewed from the front or rear of the vehicle, the resonator 15 is L-shaped with one section extending along the lower half of the vertically extending part of the upstream air duct 13 and another section running along almost the total length of the part of the upstream air duct 13 and extending outwardly.

The inside of the resonator 15 is divided by a partition wall 15a into two chambers, namely an upstream air chamber 15b and a downstream air chamber 15c. The upstream air chamber 15b is connected via a short communication pipe 16 with the vertically extending part of the upstream air duct 13 at the approximate midsection. The downstream air chamber 15c of the resonator 15 is in communication with the upstream air duct 13 near its downstream end via a short communication pipe 17. The resonator 15, which absorbs high frequency vibrations extending from the air intake duct 11, is designed so that the absorbed frequencies will differentiate between the upstream air chamber 15b and the downstream air chamber 15c so that a broad range of high frequency vibrations is effectively absorbed. In addition, the volume of resonator 15 is designed to be as large as possible in order to retain water sucked into the air intake duct 11, preventing the water from being sucked into the engine.

The wheel apron 1 is formed with a gourd-shaped hole 20 near the upstream end of the upstream air duct 13. The gourd-shaped hole 20 has two generally circular hole portions of different diameters, one hole portion being slightly larger in diameter than the outer diameter of the upstream air duct 13, and the other hole portion, which is the smaller of the two, being for harnesses and the like to go through. The hole 20 is closed with a sealing member 21, made of an elastomer such as rubber, which in turn is formed with a hole 21a which provides an opening through which harnesses can pass. The fringe area of the hole 21a is radially notched at regular intervals in order to provide a seal between the harnesses and the circumference of the opening.

As shown in FIG. 4, a receptacle engagement member 22 is formed on the surface of the sealing member 21 facing outwardly toward the side of the car, i.e., facing the space 5. A hook-like engagement member 23 is formed on the surface of the upper end of the upstream air duct 13 that faces inwardly toward the center of the car. The engagement member 23 is inserted from above, into the receptacle engagement member 22, in order to position the upstream air duct 13 relative to and on the car body.

The above description has been made relating to a supercharged engine. With a ordinary engine which is not supercharged, the upstream end of the upstream side duct 13 passes through the hole 20 formed in the wheel apron 1, its air intake opening 13a opening into the engine compartment 4. In this case, the sealing member 21 may not be used. Although the upstream air duct 13 can just be left in a state where it passes through the hole 20, it is preferable for the sealing member 31 to be used to keep a gap between the inside fringe of the hole 20 and the upstream air duct 13 airtight and elastic. The sealing member 31, like the sealing member 21, may have a hole that corresponds to the hole 21a and a sealing section that faces the hole 21a.

The joint 14 is fitted to and tied around the air ducts 12 and 13 with nearly circular ring-like ties 41 and 42, each of which has one slot in the circumference, in such a way as to contract the ties 41 and 42 in diameter by bolts 43 and 44. The air duct 11, extending from the downstream air duct 12 to the upstream air duct 13 via the joint 14, is appropriately attached to the car body at proper points. If the air duct 11 is attached to parts of the car body which have insufficient rigidity, it seems to be practical to attach the air duct 11 to the parts through the resonator 15, which has a high structural rigidity due to its box-shaped structure. However, it is preferred that the air duct 11 be attached to the car body at a point behind the elastic joint 14 and at the downstream side of the resonator 15, where vibrations have been damped. The resonator 15 itself is attached to the car body at several appropriate points 45.

With the structure described above, the air duct 13 for a supercharged engine is set in a manner shown in FIGS. 1 through 4. In this state, the air intake opening 13a is placed so as to open into the space 5, and the hole 20 formed in the wheel apron 1 is closed by the sealing member 21. In this structure, although the air intake duct 11 vibrates as air is introduced, low frequency vibrations are effectively absorbed by the supercharger. As a result, the interior noise does not present much of a problem. High frequency vibrations are effectively absorbed by the resonator 15. Further, because the temperature within the space 5 is lower than that of the engine compartment 4, the temperature of air supplied to the engine is made as low as possible, which is desirable for improving charging efficiency.

On the other hand, if the engine is an ordinary type not equipped with a supercharger, the setting of the air duct 13 shown in FIG. 5 is adopted. In this setting, the air duct 13 is disposed so as to place the air intake opening 13a so as to open into the engine compartment 4. Since the engine compartment 4 is far larger in volume than the space 5 and since there is no direct passage between the engine compartment and the passenger compartment, vibrations, especially low frequency vibrations, caused through intake of air are at a low level and are damped in the engine compartment. High frequency vibrations are absorbed by the resonator 15. Consequently, the interior noise is considerably reduced. Although the temperature of the engine compartment 4, i.e. the temperature of intake air introduced into the engine compartment 4, is relatively high, the problem is negligible for practical operations as compared to the setting of the air duct for supercharged engines because the engine is not equipped with any supercharger. This setting is also preferred in preventing water from being sucked with intake air through the intake air opening 13a.

Although the present invention has been described in detail with respect to a preferred embodiment thereof, various other embodiments and variants may occur to those skilled in the art by following the teachings herein. Such other embodiments and variants fall within the scope and spirit of the invention and are intended to be covered by the following claims.

What is claimed is:

1. An air intake device for an automotive vehicle for introducing air into an engine, said automotive vehicle having a wheel apron for forming an inner wall of an engine compartment and a fender for forming an outer wall of a vehicle body which are disposed so as to form a space therebetween, said air intake device comprising:

an air intake duct partly disposed in said space for introducing air into said engine;

said wheel apron including a hole formed therein for providing an opening through which an air intake opening end of an upstream portion of said air intake duct passes thereby placing said air intake opening end so that it opens into the atmosphere in said engine compartment.

2. An air intake device as defined in claim 1, wherein said engine is a naturally aspirated engine.

3. An air intake device for an automotive vehicle for introducing air into an engine, said automotive vehicle having a wheel apron for forming an inner wall of an engine compartment and a fender for forming an outer wall of a vehicle body which are disposed so as to form a space therebetween, said air intake device comprising:

an air intake duct partly disposed in said space for introducing air into said engine;

said wheel apron including a hole formed therein for providing an opening;

said air intake duct being selectively set between a first setting, wherein an air intake opening end of said air intake duct passes through said opening and opens into the atmosphere in said engine compartment, and a second setting, wherein said air intake duct opens within said space.

4. An air intake device as defined in claim 3, wherein said first setting is selected for a naturally aspirated engine and said second setting is selected for a supercharged engine.

5. An air intake device as defined in claim 3, and further comprising a sealing member for sealing said opening when said second setting is selected.

6. An air intake device as defined in claim 5, and further comprising engagement means, provided between said sealing member and said air intake duct, for positioning said air intake duct relative to said vehicle body.

\* \* \* \* \*